United States Patent

Narayanan et al.

Patent Number: 5,085,795
Date of Patent: Feb. 4, 1992

[54] WATER-BASED COMPOSITIONS FOR REMOVING STAINS FROM FABRICS

[75] Inventors: Kolazi S. Narayanan, Palisades Park; Paul D. Taylor, West Milford, both of N.J.

[73] Assignee: ISP Investments Inc., Wilmington, Del.

[21] Appl. No.: 658,722

[22] Filed: Feb. 21, 1991

[51] Int. Cl.$^5$ ............ C09D 9/00; C11D 7/22; C11D 7/50

[52] U.S. Cl. .................... 252/162; 134/38; 134/39; 134/40; 252/153; 252/170; 252/171; 252/DIG. 8

[58] Field of Search .......... 252/153, 162, 170, 171, 252/DIG. 8; 134/38, 39, 40

[56] References Cited

U.S. PATENT DOCUMENTS

| | | | |
|---|---|---|---|
| 4,120,810 | 10/1978 | Palmer | 252/DIG. 8 |
| 4,617,251 | 10/1986 | Sizensky | 252/153 |
| 4,664,721 | 5/1987 | Valasek | 252/153 |
| 4,812,255 | 3/1989 | Suwala | 252/DIG. 8 |
| 4,836,950 | 6/1989 | Madsen et al. | 252/DIG. 8 |
| 5,015,410 | 5/1991 | Sullivan | 252/DIG. 8 |

Primary Examiner—Paul Lieberman
Assistant Examiner—William S. Parks
Attorney, Agent, or Firm—Walter Katz; Marilyn J. Maue; Joshua J. Ward

[57] ABSTRACT

What is provided herein is a water-based, environmentally safe, stain-remover composition for effectively removing a wide variety of stains from fabrics consisting essentially of:
(a) 5–20% by weight N-methylpyrrolidone (NMP),
(b) 5–20% by weight γ-butyrolactone (BLO),
(c) 40–88% by weight water, and
(d) 1–10% by weight surfactant, and, optionally,
including a base-buffer to provide a pH in the range of about 7–11.

4 Claims, No Drawings

WATER-BASED COMPOSITIONS FOR REMOVING STAINS FROM FABRICS

BACKGROUND OF THE INVENTION

1. Field of the Invention

This invention relates to stain-removers, and more particularly, to water-based stain-remover compositions which are effective for removing stains from fabrics.

2. Description of the Prior Art

A number of solvent-based products are currently available in the market as heavy duty spot or stain removers for fabrics. One such organic solvent-based product contains several volatile active components therein, particularly perchloroethylene. A water-based stain-remover on the market for this purpose comprises a mixture of water and a surfactant. However, the first of these products contains an objectionable toxic chlorinated solvent, and the second is less effective with respect to removal of objectionable stains from fabrics.

UK Patent Application GB 2,191,501 A, published Dec. 16, 1987, discloses a composition for removal of graffiti from the walls of buildings and like substrates. The composition consists of 25-50% by weight of N-alkyl-2-pyrrolidone (NMP), 25-50% by weight of an alkyl lactone, such as gamma-butyrolactone (BLO), and water in an amount of 0 to 50% by weight of the composition. Example 2 of this patent discloses a composition of 40% NMP, 40% BLO, 13% water and 7% of optional components which can act as solvents for resin residues. The described composition, however, is suitable only for resin softening and solubilization of graffiti made with paints, inks and the like applied to non-porous surfaces.

Accordingly, it is an object of this invention to provide a water-based, pre-wash, stain-remover composition which does not include any chlorinated solvent and which is particularly effective for removing a wide variety of objectionable stains on fabrics.

SUMMARY OF THE INVENTION

What is provided herein is a water-based, stain-remover composition for effectively removing a wide variety of stains from fabrics consisting essentially of:

(a) 5-20% by weight NMP,
(b) 5-20% by weight BLO,
(c) 40-88% by weight water, and including a base-buffer to provide a pH of about 7-11.

DETAILED DESCRIPTION OF THE INVENTION

The water-based, pre-wash, stain-remover composition of the invention which will remove objectionable stains from fabrics consists essentially of:

TABLE I

| COMPOSITION OF INVENTION | | | |
|---|---|---|---|
| | Concentration (% by wt) | | |
| Component | Suitable | Preferred | Optimum |
| Essential | | | |
| NMP | 5-20 | 8-12 | 10 |
| BLO | 5-20 | 8-12 | 10 |
| Water | 40-88 | 50-80 | 74 |
| Surfactant | 1-10 | 2-8 | 5 |
| Base (buffer) | 0.1-5 | 0.5-3 | 1 |
| Optional | | 0-10% | |
| Bleaching agent (e.g. hypochlorite, bisulfite, thiosulfate) | | | |
| Enzyme | | | |
| Thickener (a water soluble polymer, e.g. Klucel, Carbopol, polypropylene glycol) | | | |

Typical surfactants include ethoxylated alkyl phenols, linear aliphatic polyesters, linear aromatic polyesters, polyethoxylated alcohols, linear aliphatic ethoxylates, polyethoxylated castor oil, polyethoxylated carboxylates, and polyethoxylated alkylamines; fluorinated surfactants such as perfluoroalkylethoxylates and silicone surfactants such as alkenyloxy siloxanes. Anionic surfactants may be used as the emulsifiers and include phosphate esters and their salts, alkyl sulfates and sulfonates, salts of sulfated nonylphenoxypoly(ethyleneoxy) ethanol, salts of alkylbenzene sulfonates, salts of alkylnaphthalene sulfonate, and sulfonated aliphatic polyesters and their salts. Also suitable are complex phosphate esters of nonionic surfactants of the ethylene oxide type which are mixtures of diesters of phosphoric acid and fluorinated surfactants such as mono and bis perfluoroalkyl phosphates and salts, fluoroalkyl sulfates, sulfonates and cationic surfactants such as quaternized perfluoroalkylamines and the like. (See, for example, McCutcheon's, *Emulsifiers and Detergents* (1989), published by McCutcheon's Division of M.C. Publishing Co., Glen Rock, N.J.).

The pre-wash, stain-remover composition of the invention may be used in the form of a solution or gel, and applied directly to the spot on the fabric, or added to a clothes washer, or included in a cleaning detergent formulation.

The composition herein is prepared by mixing the individual components in water solution. Most preferred formulations are given below.

TABLE II

| PREFERRED COMPOSITIONS OF INVENTION | | |
|---|---|---|
| | A | B |
| NMP | 10 | 10 |
| BLO | 10 | 10 |
| Water | 53.2 | 71.2 |
| Surfactant | | |
| Dodecyl benzene sulfonic acid | 1 | 0 |
| Gafac RA-600 | 3 | 3 |
| Nekol WT-27 | 0 | 2 |
| N-octylpyrrolidone | 2 | 0 |
| Base (buffer) | | |
| NH$_4$OH as 100% NH$_3$ | 1.8 | 1.8 |
| TEA (triethanolamine) | 2 | 0 |
| tetrapotassium pyrophosphate | 2 | 0 |
| trisodium phosphate | 0 | 2 |
| citric acid | 5 | 0 |
| Solvent | | |
| propylene glycol | 10 | 0 |
| pH | 7.5 | 10.2 |

The formulations of Table II were evaluated as compared with the commercial product "Improved Shout". The results are summarized below.

TABLE III

Stain Remover of Invention (A and B) vs "Improved Shout" Product
% Stain Removed

| Fabric | Stain | Ex. A | Commercial Product "Improved Shout" | Ex. B | Commercial Product "Improved Shout" |
|---|---|---|---|---|---|
| Duration between application and washing - no detergent | | 15 m | 15 m | 1 m | 1 m |
| CPPP | wine | 95 | 65 | 95 | 30 |
| CPPP | grass | 95 | 70 | 90 | 20 |
| CPPP | coffee | 100 | 85 | 100 | 30 |
| CPPP | spaghetti | 75-80 | 85 | 75 | 40 |
| Cotton | chocolate | 30 | 15-20 | 5-10 | 10 |
| CPPP | cosmetic makeup | 85 | 40-50 | 65 | 20 |
| CPPP | motor oil | 10 | 5-10 | 5 | 5 |
| Cotton/polyester | grass humus milk | 40 | 25 | 20 | 30 |
| Cotton | dust sebum | 20 | 0 | 20 | 20 |
| CPPP | blood | 10 | 5 | 15 | 0 |
| Cotton | lipstick | 30 | 40 | 15 | 0 |
| Average on a scale of 0-10 | | 5.4 | 4.0 | 4.6 | 2.2 |
| Average of 3 independent evaluators | | 5.4 ± 0.5 | 5.0 ± 0.4 | 4.1 ± 0.7 | 3.7 ± 0.6 |

CPPP - cotton polyester

Tensile Strength

To ascertain the effect of prolonged exposure, blank cotton, polyester and cotton-polyester unstained fabrics (swatches) were immersed in formulation A and B of invention. The soaked fabrics were left overnight to dry in air for 24 hours. The thus air dried-unwashed fabrics after standing in air for a week were analyzed by Instron for their tensile strength by the modified ASTM-1682 test method. The results of these tests showed practically no difference between treated and control samples with respect to tensile strength of the fabric.

While the invention has been described with particular reference to certain embodiments thereof, it will be understood that changes and modifications may be made which are within the skill of the art. Accordingly, it is intended to be bound only by the following claims, in which:

What is claimed is:

1. A water-based, stain-remover composition for effectively removing a wide variety of stains from fabrics consisting essentially of:
   (a) 5-20% by weight NMP,
   (b) 5-20% by weight BLO,
   (c) 40-88% by weight water, and
   (d) 1-10% by weight surfactant, and, optionally, including a base-buffer to provide a pH of about 7-12.

2. A composition according to claim 1 consisting essentially of:
   (a) 8-12% NMP,
   (b) 8-12% BLO,
   (c) 50-80% water, and
   (d) 2-8% surfactant, and
   a base-buffer providing a pH of about 7 to 12.

3. A composition according to claim 1 consisting essentially of:
   (a) 10% NMP,
   (b) 10% BLO,
   (c) 70% water,
   (d) 5% surfactant, and
   a base-buffer providing a pH of about 7.5 to 11.0.

4. A composition according to claim 1 further including one or more of the following: a bleaching agent, an enzyme and a thickener.

* * * * *